(12) United States Patent
Göser et al.

(10) Patent No.: US 6,966,763 B2
(45) Date of Patent: Nov. 22, 2005

(54) ARRANGEMENT FOR MAKING A BELT MADE OF PLASTICATABLE MATERIAL

(75) Inventors: Hubert Göser, Dannenberg (DE); Thomas Winkler, Dannenberg (DE); André Kucharczyk, Gülden (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 220 days.

(21) Appl. No.: 10/440,097

(22) Filed: May 19, 2003

(65) Prior Publication Data

US 2004/0022890 A1 Feb. 5, 2004

(30) Foreign Application Priority Data

May 17, 2002 (DE) ................................ 102 22 015

(51) Int. Cl.[7] .......................... B29C 59/04; B29F 47/52
(52) U.S. Cl. ....................... 425/115; 425/503; 425/363; 425/382.3; 425/113; 425/114; 425/131.1; 425/133.5
(58) Field of Search ........................ 425/115, 503, 363, 425/382.3, 113, 114, 131.1, 133.5

(56) References Cited

U.S. PATENT DOCUMENTS

| | | | |
|---|---|---|---|
| 3,880,558 A * | 4/1975 | Breher et al. ................ | 425/115 |
| 3,945,781 A * | 3/1976 | Doleman ..................... | 425/115 |
| 3,999,914 A * | 12/1976 | Breher et al. ................ | 425/114 |
| 4,058,424 A * | 11/1977 | Breher ........................ | 156/137 |
| 4,563,323 A * | 1/1986 | Breher ....................... | 264/279.1 |
| 4,854,996 A * | 8/1989 | Baus ........................ | 156/244.12 |
| 5,643,400 A * | 7/1997 | Bernard et al. ............. | 156/500 |

FOREIGN PATENT DOCUMENTS

| | | | | |
|---|---|---|---|---|
| DE | 21 23 902 | | 11/1972 | |
| DE | 3527640 | | 2/1987 | |
| DE | 3527640 A1 | * | 2/1987 | ............. F16G 1/21 |

* cited by examiner

Primary Examiner—Robert Davis
Assistant Examiner—G. Nagesh Rao
(74) Attorney, Agent, or Firm—Walter Ottesen

(57) ABSTRACT

The two belt parts (2a, 2b) of a belt (2) made of plasticatable material are produced with the aid of a first station (6) and a second station (8). The first station (6) includes a rotatable mold drum (14) and a continuous mold belt (18). The mold belt (18) is brought together with the mold drum (14) along a peripheral section via an upper pressure roller (20), a lower pressure roller (22) and a tensioning roller (24) in such a manner that a hollow mold space (26) is formed between the mold drum (14) and the mold belt (18). An extruder (10) is mounted forward of the hollow mold space (26). Furthermore, the first station (6) includes a filament feed (28) for forming a reinforcement layer (4) in the first belt part (2a). For a simplified manufacture of the belt (2), the second station (8) includes only a direction-changing roller (30) in addition to the extruder (12) and a mold drum (16). The spacing (32) between the direction-changing roller (30) and the second mold drum (16) equals the thickness of the belt (2) to be manufactured. To limit and guide the first belt part (2a) to be manufactured and/or the belt (2), the first mold drum (14), the second mold drum (16) and/or the direction-changing roller (30) are preferably provided with flange discs (14a, 14b; 16a, 16b and/or 30a, 30b). In order to make possible a targeted softening of the surfaces of the belt parts to be joined, the various rollers (20, 22, 34, 34', 35, 35') and the two mold drums (14, 16) can be provided with heating/cooling.

21 Claims, 2 Drawing Sheets

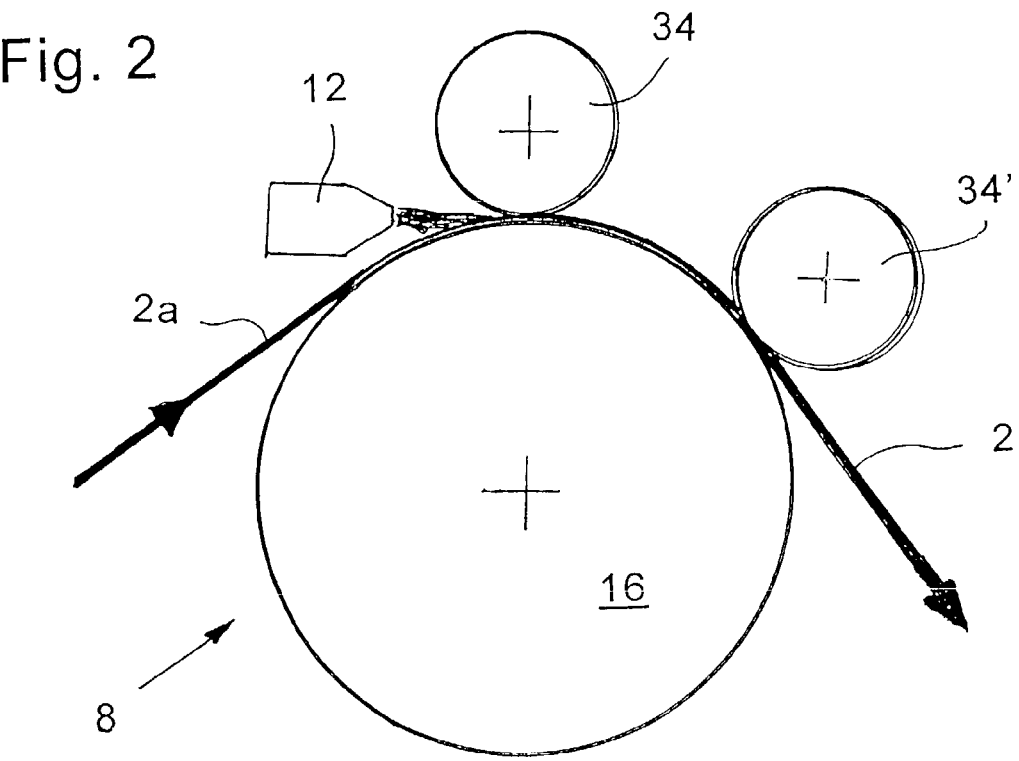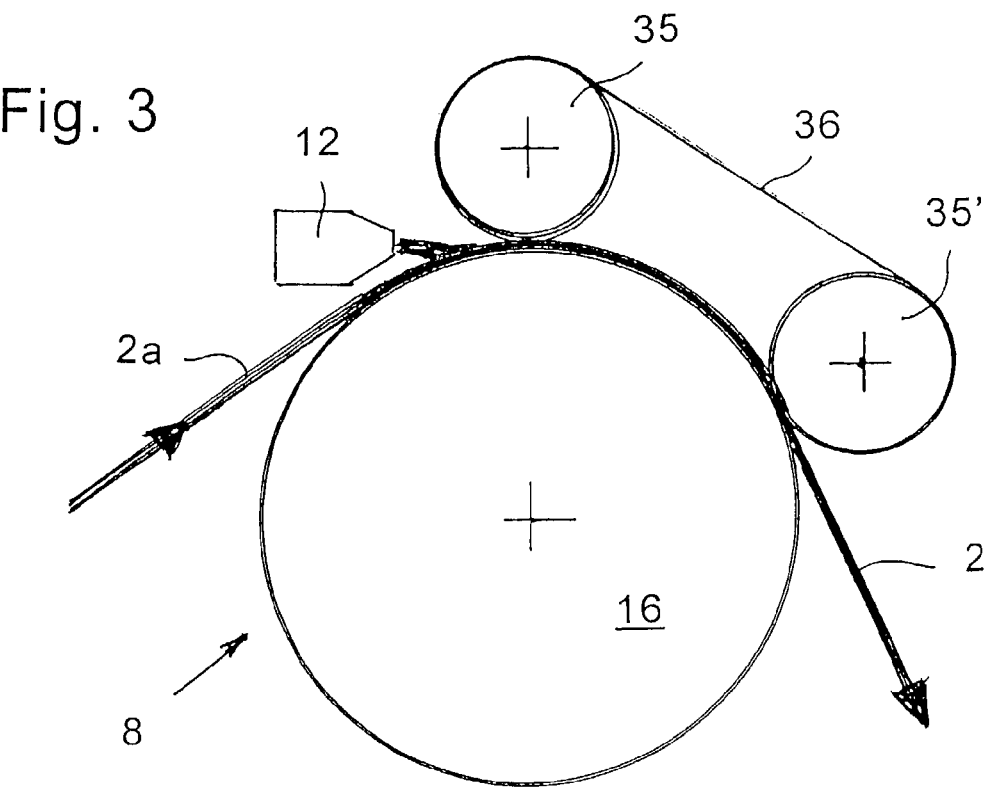

ARRANGEMENT FOR MAKING A BELT MADE OF PLASTICATABLE MATERIAL

BACKGROUND OF THE INVENTION

An arrangement for manufacturing belts made of plasticatable material is disclosed in German patent publication 3,527,640.

The belt made of plasticatable material has two belt parts. The first belt part is produced with the aid of a first station which includes a rotatable mold drum and a continuous mold belt. The mold belt is brought together with the mold drum along a peripheral portion via an upper pressure roller, a lower pressure roller and a tensioning roller in such a manner that a hollow mold space is formed between the mold drum and the mold belt. An extruder is mounted ahead of the hollow mold space. Means for feeding individual filaments or groups of filaments are assigned to the first station for forming a reinforcement layer in the belt part which is produced in the first station.

A second station likewise has a rotatable mold drum, a mold belt and an extruder. With the aid of the second station, a hollow mold space is formed between the mold drum and the mold belt for forming the second belt part likewise by means of an upper pressure roller, a lower pressure roller and a tensioning roller. The first belt part is disposed on the mold belt. For this reason, the second belt part is formed onto the first belt part during the manufacturing process of the second belt part.

From the above, it can be seen that two complete stations are required for manufacturing the two belt parts. This constitutes considerable expense and complexity.

The first mold belt has neither flange discs nor other lateral limiting means. The width of the first belt part manufactured on such a mold drum is therefore completely undefined so that the desired belt width must be realized in a further operating step by longitudinal cuts. To improve the joining of the two belt parts to each other, the first belt part is replasticated in the region of the connecting surface. However, there is no explanation as to how this is to be done.

SUMMARY OF THE INVENTION

It is an object of the invention to provide an arrangement for manufacturing a belt joined together from two belt parts which constitutes an improvement over that described above.

The arrangement of the invention for making a belt made of plasticatable material includes: a first station for making a first belt part; the first station including a first extruder and a first mold drum; a continuous mold belt assembly including an upper pressure roller, a lower pressure roller, a tensioning roller and a continuous mold belt; the upper pressure roller, the lower pressure roller and the tensioning roller being mounted relative to the first mold drum so as to guide the continuous mold belt over an arcuate portion of the peripheral surface of the first mold drum so as to permit the continuous mold belt and the first mold drum to conjointly define a hollow mold space over the arcuate portion of the peripheral surface; a filament feed for feeding filaments into the hollow mold space; the first station further including a first extruder for outputting the plasticatable material onto the first mold drum whereby the first belt part is formed with the filaments between the mold drum and the mold belt; a second station for making a second belt part and for forming the second belt part onto the first belt part; the second station including a second mold drum and a direction-changing roller for guiding the first belt part to the second mold drum; a second extruder for outputting plasticatable material onto the first belt part thereby forming the second belt part which is joined to the first belt part on the second mold drum to form the belt; and, the direction-changing roller and the second mold drum conjointly defining a spacing therebetween which corresponds to the thickness of the belt.

The above arrangement of the invention has only one mold drum at the second station. In lieu of the otherwise usual mold belt which must be guided over various rollers, the arrangement of the invention has only one direction-changing roller. The spacing between the mold drum and the pressure roller defines the desired thickness of the belt to be produced and this spacing is adjustable. According to another feature of the invention, the second station can have two contact pressure rollers or two ancillary rollers connected to each other by an ancillary belt.

A predetermined contact pressure of the belt against the second mold drum can be supported in an advantageous manner by means of a pull-off device. A reliable contact pressure of the first belt part against the second belt part is ensured in this way during cooling. When the two mold drums and possibly also the direction-changing roller have flange discs or other means for laterally guiding the belt part which is to be made, a subsequent cutting of the manufactured belt is unnecessary.

Different synthetic materials have different flow temperatures. To obtain a targeted softening of the belt part surfaces, which are to be joined, the upper and/or lower pressure roller(s) and/or the bracket rollers can be provided with heating or cooling for the individual temperature control of the belt surfaces. Additionally, a temperature control of the mold belts is also a possibility. In this way, belt parts of different materials can be reliably joined to each other.

A defined roughness depth or structure on the product surface can be obtained via a pregiven structure on the peripheral surface of at least one of the two mold drums.

The arrangement of the invention is especially suitable for the manufacture of flat belts.

BRIEF DESCRIPTION OF THE DRAWINGS

The invention will now be described with reference to the drawings wherein:

FIG. 2 is a schematic of the second station of a first alternate embodiment of the arrangement of the invention; and, FIG. 3 is a schematic of the second station of a second alternate embodiment of the arrangement of the invention.

DESCRIPTION OF THE PREFERRED EMBODIMENTS OF THE INVENTION

Figure 1:
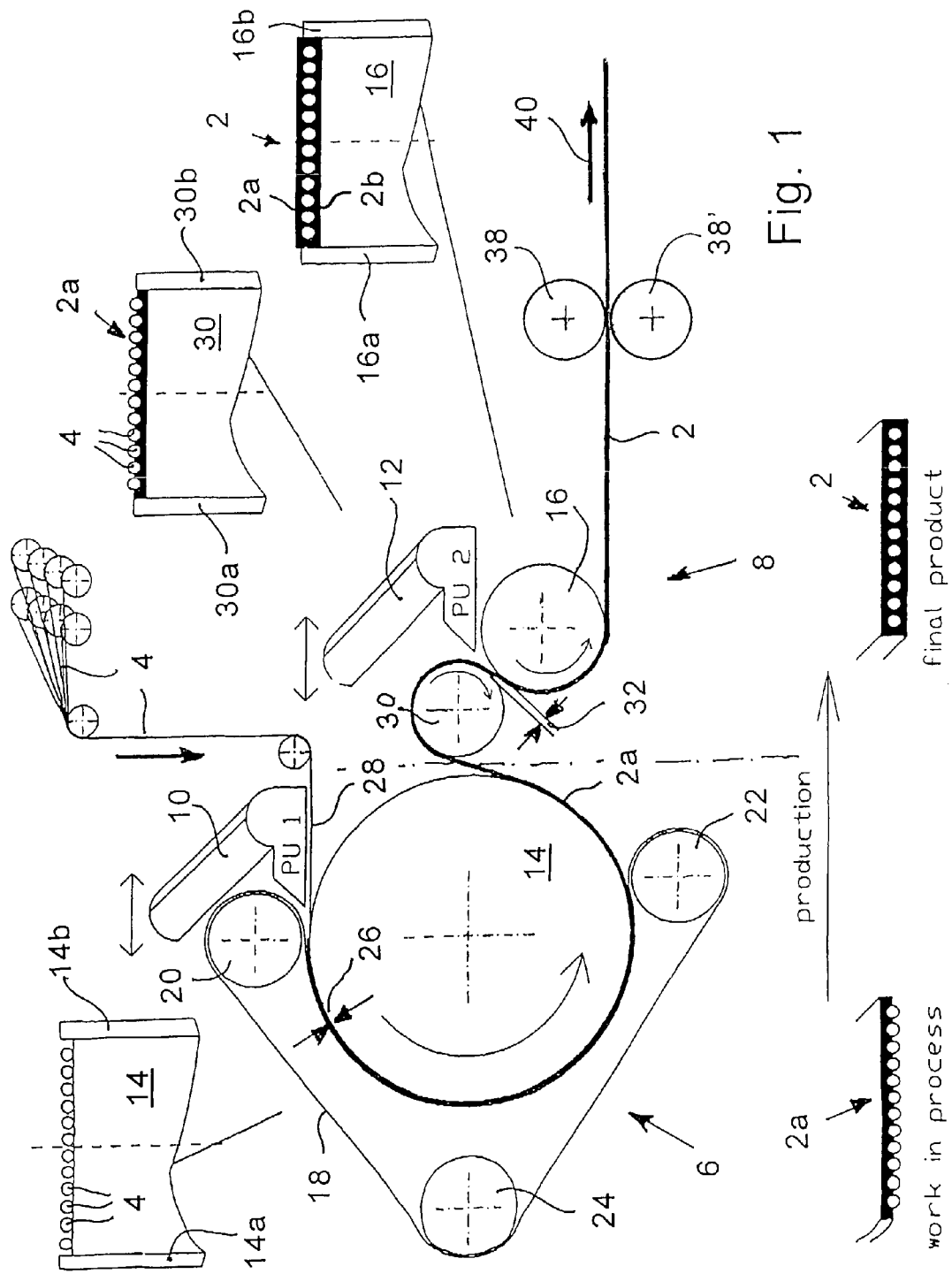
FIG. 1 is a schematic of a first embodiment of the arrangement of the invention for making a belt made of plasticatable material.

As shown in FIG. 1, the arrangement for making a belt 2 reinforced with a reinforcement layer 4 has a first station 6 and a second station 8. The first station 6 functions to make a first belt part 2a and comprises a mold drum 14, which is rotatable in the counterclockwise direction, and a continuous mold belt 18 which slings around an arcuate section of the mold drum 14. The ends of the arcuate section are defined by an upper pressure roller 20 and a lower pressure roller 22 in combination with a tensioning roller 24. A hollow mold space 26 is formed between the segment of the mold belt 18 and the peripheral arcuate surface of the mold drum 14 disposed therebelow. With the aid of the tensioning roller 24, the contact pressure of the mold belt 18 on the mold drum 14 can be adjusted. Furthermore, the first station 6 includes an extruder 10 and a filament feed 28.

To manufacture the first belt part 2a on the first station 6, a plasticatable synthetic material (for example, PU) is outputted from the extruder 10 onto the temperature-controlled mold drum 14. At the same time, the reinforcement layer is metered via the filament feed 28. Because of the filament tension, the filaments 4 are pressed onto the peripheral surface of the mold drum 14 where they define the lower side of the first belt part 2a formed between the mold drum 14 and the mold belt 18.

A second station 8 directly follows the first station 6. This second station 8 comprises a direction-changing roller 30 and a temperature-controlled mold drum 16. Like the first station 6, the second station 8 has an extruder 12.

For making a second belt part 2b or, more specifically, for making a finished belt 2 comprising the first belt part 2a and the second belt part 2b, the first belt part 2a is slung about the direction-changing roller 30 directly after leaving the mold drum 14 and is then slung about the mold drum 16. With the aid of the extruder 12, a plasticated synthetic material is applied to the side of the first belt part 2a provided with the reinforcement layer 4 and is moved to the intermediate space formed between the first belt part 2a and the mold drum 16. This intermediate space is the spacing 32 between the direction-changing roller 30 and the second mold drum 16. Here, the second belt part 2b is formed and is immediately joined to the first belt part 2a. Compared to the first station 6, the reinforcement layer 4 of the first belt part 2a assumes the function of a mold belt in that the belt 2, which leaves the mold drum 16, is guided over to rollers (38, 38') and is subjected to a pregiven tension by a pull-off device represented schematically by arrow 40. The roller 30 is strictly a direction-changing roller.

The first mold drum 14 has flange discs (14a, 14b) to limit and guide the first belt part 2a.

The second mold drum 16 is likewise provided with flange discs (16a, 16b) to limit and guide the manufactured product 2 formed by joining the first and second belt parts (2a, 2b) to each other.

The flange discs (30a, 30b) are shown on the direction-changing roller 30 and can be provided as a supplement but are not absolutely necessary.

FIGS. 2 and 3 show alternate embodiments of the second station 8. As in the embodiment of FIG. 1, both the second stations 8 in FIGS. 2 and 3 have a mold drum 16. In these embodiments, the direction-changing roller is omitted. Instead, the first belt part 2a produced in the first station 6 arrives directly on the second mold drum 16 without a change of direction. The second station 8 includes two pressure-applying rollers (34, 34') and an extruder 12 as shown in FIG. 2. The final product thickness is generated by means of the first pressure roller 34.

The upper and/or lower pressure rollers (20, 22) shown in FIG. 1 are provided with heating/cooling for indirectly controlling the temperature of the steel belt. To obtain overall optimal manufacturing conditions, a temperature control of the mold drums 14 and 16 can be additionally provided.

What is special in the alternate embodiment of FIG. 3 is that here two bracket rollers (35, 35') are provided connected to each other via an ancillary belt 36. At least one of the bracket rollers 35 and/or 35' functions simultaneously as a tensioning drum for the ancillary belt 36.

Finally, in the second station 8 of FIGS. 2 and 3, the pressure rollers (34, 34') or the bracket rollers (35, 35') can be provided with means for controlling temperature.

It is understood that the foregoing description is that of the preferred embodiments of the invention and that various changes and modifications may be made thereto without departing from the spirit and scope of the invention as defined in the appended claims.

What is claimed is:

1. Arrangement for making a belt made of plasticatable material, the arrangement comprising:

a first station for making a first belt part;

said first station including a first extruder and a first mold drum;

a continuous mold belt assembly including an upper pressure roller, a lower pressure roller, a tensioning roller and a continuous mold belt;

said upper pressure roller, said lower pressure roller and said tensioning roller being mounted relative to said first mold drum so as to guide said continuous mold belt over an arcuate portion of the peripheral surface of said first mold drum so as to permit said continuous mold belt and said first mold drum to conjointly define a hollow mold space over said arcuate portion of said peripheral surface;

a filament feed for feeding filaments into said hollow mold space;

said first station further including a first extruder for outputting the plasticatable material onto said first mold drum whereby said first belt part is formed with said filaments between said mold drum and said mold belt;

a second station for making a second belt part and for forming said second belt part onto said first belt part;

said second station including a second mold drum and a direction-changing roller for guiding said first belt part incorporating said filaments to said second mold drum;

a second extruder for outputting plasticatable material onto said first belt part thereby forming said second belt part which is joined to said first belt part on said second mold drum to form said belt;

said direction-changing roller and said second mold drum conjointly defining a spacing therebetween which corresponds to the thickness of said belt; and, said second station further including means for applying a force to said belt as said belt leaves said second mold drum so as to cause said first belt part with said filaments to function as a mold belt with respect to said second belt part.

2. The arrangement of claim 1, wherein said plasticatable material is a plasticatable synthetic material.

3. The arrangement of claim 1, wherein said spacing between said direction-changing roller and said second mold drum is adjustable.

4. The arrangement of claim 1, wherein said force applying means is a pull-off device acting on said belt for generating a predetermined radial contact pressure of said belt against said second mold drum.

5. The arrangement of claim 1, wherein at least one of said first mold drum, said direction-changing roller and said second mold drum include means for laterally guiding the belt part or belt corresponding thereto.

6. The arrangement of claim 1, wherein at least one of said upper pressure roller and said lower pressure roller includes means for cooling or heating.

7. The arrangement of claim 1, wherein each of said first and second mold drums include means for controlling the temperature of the surface thereof.

8. The arrangement of claim 1, wherein said first mold drum and said second mold drum have surface structures to impart a defined depth of roughness to said belt on one or both sides thereof.

9. The arrangement of claim 1, wherein said belt is a flat belt.

10. The arrangement of claim 1, wherein said direction-changing roller is the only direction-changing roller of said arrangement.

11. Arrangement for making a belt made of plasticatable material, the arrangement comprising:
a first station for making a first belt part;
said first station including a first extruder and a first mold drum;
a continuous mold belt assembly including an upper pressure roller, a lower pressure roller, a tensioning roller and a continuous mold belt;
said upper pressure roller, said lower pressure roller and said tensioning roller being mounted relative to said first mold drum so as to guide said continuous mold belt over an arcuate portion of the peripheral surface of said first mold drum so as to permit said continuous mold belt and said first mold drum to conjointly define a hollow mold space over said arcuate portion of said peripheral surface;
a filament feed for feeding filaments into said hollow mold space;
said first station further including a first extruder for outputting the plasticatable material onto said first mold drum whereby said first belt part is formed with said filaments between said mold drum and said mold belt;
a second station for making a second belt part and for forming said second belt part onto said first belt part;
said second station including a second mold drum receiving said first belt part thereon directly from said first mold drum;
a second extruder for outputting plasticatable material onto said first belt part thereby forming said second belt part which is joined to said first belt part on said second mold drum to form said belt;
said second station further including first and second pressure-applying rollers for applying a pressure to said belt on said second drum; and,
at least one of said first and second pressure-applying rollers generating the final thickness of said belt.

12. The arrangement of claim 11, wherein said plasticatable material is a plasticatable synthetic material.

13. The arrangement of claim 11, wherein at least one of said first mold drum and said second mold drum include means for laterally guiding the belt part or belt corresponding thereto.

14. The arrangement of claim 11, wherein at least one of said upper pressure roller, said lower pressure roller and said pressure-applying rollers includes means for cooling or heating.

15. The arrangement of claim 11, wherein each of said first and second mold drums include means for controlling the temperature of the surface thereof.

16. Arrangement for making a belt made of plasticatable material, the arrangement comprising:
a first station for making a first belt part;
said first station including a first extruder and a first mold drum;
a continuous mold belt assembly including an upper pressure roller, a lower pressure roller, a tensioning roller and a continuous mold belt;
said upper pressure roller, said lower pressure roller and said tensioning roller being mounted relative to said first mold drum so as to guide said continuous mold belt over an arcuate portion of the peripheral surface of said first mold drum so as to permit said continuous mold belt and said first mold drum to conjointly define a hollow mold space over said arcuate portion of said peripheral surface;
a filament feed for feeding filaments into said hollow mold space;
said first station further including a first extruder for outputting the plasticatable material onto said first mold drum whereby said first belt part is formed with said filaments between said mold drum and said mold belt;
a second station for making a second belt part and for forming said second belt part onto said first belt part;
said second station including a second mold drum receiving said first belt part thereon directly from said first mold drum;
a second extruder for outputting plasticatable material onto said first belt part thereby forming said second belt part which is joined to said first belt part on said second mold drum to form said belt; and,
said second station further including two bracket rollers for contact engaging said belt while on said second mold drum; and,
an ancillary belt connecting said bracket rollers to each other.

17. The arrangement of claim 16, wherein at least one of said two bracket rollers functions to adjust the tension in said ancillary belt.

18. The arrangement of claim 16, wherein said plasticatable material is a plasticatable synthetic material.

19. The arrangement of claim 16, wherein at least one of said first mold drum and said second mold drum include means for laterally guiding the belt part or belt corresponding thereto.

20. The arrangement of claim 16, wherein at least one of said upper pressure roller, said lower pressure roller and said bracket rollers includes means for cooling or heating.

21. The arrangement of claim 16, wherein each of said first and second mold drums include means for controlling the temperature of the surface thereof.

* * * * *